US006977580B2

(12) United States Patent
Banerjee et al.

(10) Patent No.: US 6,977,580 B2
(45) Date of Patent: Dec. 20, 2005

(54) APPARATUS, SYSTEM AND METHOD OF SECURING PERIMETERS OF SECURITY ZONES FROM SUSPECT VEHICLES

(75) Inventors: Dwip N. Banerjee, Austin, TX (US); Kumar Ravi, Cedar Park, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 10/256,107

(22) Filed: Sep. 26, 2002

(65) Prior Publication Data

US 2004/0061629 A1 Apr. 1, 2004

(51) Int. Cl.[7] .......................... H04B 1/00; B60R 25/10; G06F 19/00

(52) U.S. Cl. ............................ 340/426.16; 340/426.11; 340/5.21; 340/5.31; 340/5.7; 340/979; 340/935; 340/10.2; 340/10.6; 340/438; 340/426; 455/569; 180/167; 180/287; 701/1; 701/33; 701/48; 702/188

(58) Field of Search ............... 340/5.7, 426.11–426.16, 340/5.31, 5.21, 979, 935, 10.2–10.6, 426, 340/438; 180/287, 167; 455/569; 702/188; 701/1, 33, 48

(56) References Cited

U.S. PATENT DOCUMENTS

| | | | | | |
|---|---|---|---|---|---|
| 4,651,157 | A | * | 3/1987 | Gray et al. | 342/457 |
| 5,058,044 | A | * | 10/1991 | Stewart et al. | 702/184 |
| 5,570,087 | A | * | 10/1996 | Lemelson | 340/870.05 |
| 5,974,368 | A | | 10/1999 | Schepps et al. | 702/188 |
| 6,195,602 | B1 | | 2/2001 | Hazama et al. | 701/48 |
| 6,202,008 | B1 | | 3/2001 | Beckert et al. | 701/33 |
| 6,225,890 | B1 | | 5/2001 | Murphy | 340/426 |
| 6,362,730 | B2 | | 3/2002 | Razavi et al. | 340/438 |
| 6,370,449 | B1 | | 4/2002 | Razavi et al. | 701/1 |
| 6,377,825 | B1 | | 4/2002 | Kennedy et al. | 455/569 |
| 6,392,531 | B1 | * | 5/2002 | Gabbard | 340/5.31 |
| 6,731,202 | B1 | * | 5/2004 | Klaus | 340/425.5 |
| 2004/0148137 | A1 | * | 7/2004 | Zerwekh et al. | 702/188 |

* cited by examiner

*Primary Examiner*—Michael Horabik
*Assistant Examiner*—Kimberly Jenkins
(74) *Attorney, Agent, or Firm*—Volel Emile; Herman Rodriguez

(57) ABSTRACT

An apparatus, system and method of identifying a vehicle that may present safety threats to security areas are provided. When a vehicle is approaching a security zone, a request for identification (ID) is issued to the vehicle's on-board computer system (OBCS). Upon receiving the ID, a comparison is made between the ID of the vehicle and a list of suspect vehicle IDs. It there is a match, the vehicle is considered to be suspect and the OBCS is instructed to take control over the vehicle.

20 Claims, 7 Drawing Sheets

APPARATUS, SYSTEM AND METHOD OF SECURING PERIMETERS OF SECURITY ZONES FROM SUSPECT VEHICLES

BACKGROUND OF THE INVENTION

1. Technical Field

The present invention is directed to vehicles. More specifically, the invention is directed to vehicles that may pose security threats to security areas.

2. Description of Related Art

In the past twenty years or so, there has been a rash of bombings using vehicles laden with explosives. Vehicles, in this context, include any self-propelled machines such as aircrafts, vessels (i.e., boats), cars etc. As an example, 63 people died in 1983 when a suicide bomber driving a van loaded with explosives destroyed the front portion of the US Embassy in Beirut, Lebanon. Later that year, 245 United States marines, soldiers and sailors were killed and 146 wounded when a suicide bomber exploded a truck loaded with explosives near US Marine barracks in that same city. Minutes later, 58 French paratroopers were killed in their barracks by another truck bomb.

In 1993, a truck exploded in a basement garage of the World Trade Center in New York City, N.Y. killing six and injuring more than 1,040 people. In 1995, a truck bomb exploded outside a federal office building in Oklahoma City, killing 168 people, including 19 children. In 1996, a truck bomb exploded outside of Khobar Towers military complex killing 19 American servicemen and injuring hundreds of others in Dhahran, Saudi Arabia. In 1998, two truck bombs exploded almost simultaneously near two US Embassies, one in Nairobi, Kenya and the other in Dar Es Salaam, Tanzania, killing 224 (213 in Kenya and 11 in Tanzania) and injuring about 4,500 others. In 2000, U.S. Navy destroyer USS Cole was heavily damaged when a small boat loaded with explosives blew up alongside the destroyer in Aden, Yemen. Seventeen sailors were killed. In 2001, the twin towers making up the World Trade Center in New York City were destroyed when hijackers crashed two commercial airplanes each into a tower. One hour or so later, another hijacked airplane was crashed into the Pentagon in Arlington, Va. The total dead and missing in these incidents numbered more than 2,800. Although the hijacked airplanes were not loaded with explosives, the airplanes themselves, which each were fueled for a trans-continental flight, were used as the bombs.

In all the incidents mentioned above, the vehicle bombs were able to inflict as many human casualties and as much damage as they did because of their close proximity to the target structures when they exploded. If vehicles that may present security threats are restricted from being within a security zone of sensitive areas, damages and/or casualties may be greatly reduced or altogether eliminated.

Thus, what is needed is a method, apparatus and system for identifying vehicles that may present a safety threat to a security area and for taking commensurate actions where they are so identified.

SUMMARY OF THE INVENTION

The present invention provides an apparatus, system and method of identifying a vehicle that may present safety threats to security areas. The apparatus, system and method determine whether a vehicle is a suspect vehicle by comparing an identification (ID) obtained from the vehicle with a list of IDs when the vehicle approaches a security zone of the security area. If there is a match, the vehicle is a suspect vehicle and may present a safety threat to the security area. At that point, the vehicle is not allowed to proceed. If the vehicle is a land-based vehicle, the vehicle may be allowed to proceed after it has been thoroughly searched. If the vehicle attempts to proceed before being allowed to do so, a signal is sent to a computer system on board the vehicle (OBCS) to stop the vehicle from proceeding. In the case where the vehicle is not a land-based vehicle, the signal may instruct the OBCS to veer the vehicle off its course.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
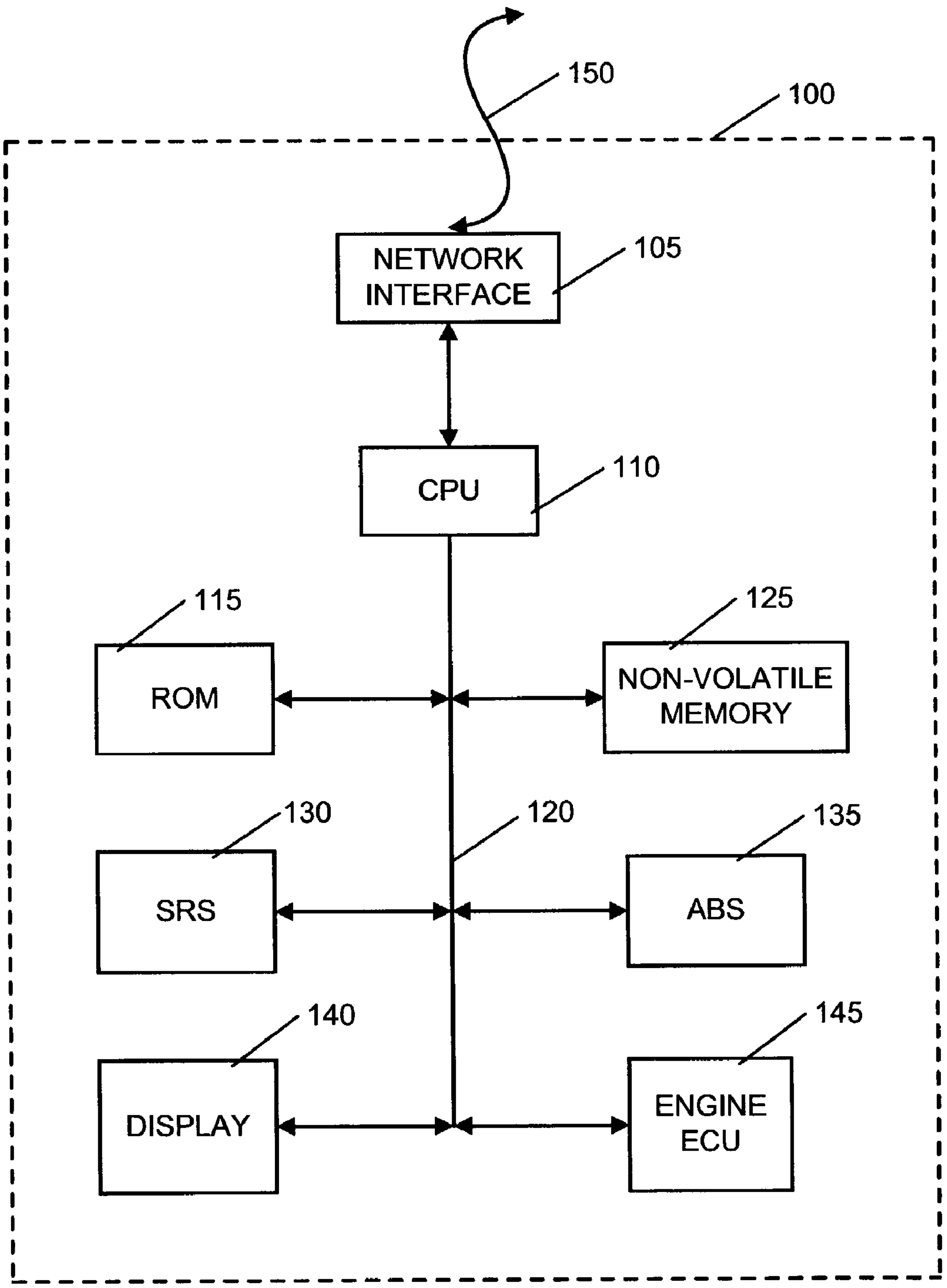
FIG. 1 depicts a schematic block diagram of an on-board computer system (OBCS) of a vehicle.

Modern vehicles are typically equipped with an on-board computer system (OBCS). The OBCS is used to perform diagnostic functions as well as to control the vehicles. FIG. 1 depicts a schematic block diagram of an exemplary OBCS 100 of a vehicle. The OBCS 100 includes a CPU 110 that is connected to a non-volatile memory 125, an anti-lock braking system (ABS) 135, an engine electronic control unit (ECU) 145, ROM 115, supplemental restraint system (SRS) 130 and dash display (140) through bus 120.

The non-volatile memory 125 may be used to store data such as odometer readings, total mileage of the vehicle, the vehicle identification number (VIN), etc. The ROM 115 may be used to store a software package that controls the CPU 110. For example, the CPU 110, under the control of the software package, may display battery voltage, speedometer readings, turn on and/or off all dash display lights etc.

The ABS 135 may have its own co-processor or use the CPU 110. In either case, when a driver applies the brake in a panic, the ABS may modulate the breaking force that is actually applied to the wheels. Furthermore, if a wheel is slipping, the ABS 135 may slow the wheel down and/or shift the driving force to a non-slipping wheel etc.

The engine ECU 145 controls the engine, self-diagnoses abnormalities relating to the exhaust emission of the engine and transmits the information to the CPU 110 for storage into the non-volatile memory 125 and/or for display on display 140. For example, a problem with the engine may turn on a "check engine" light on the dashboard. The problem may be stored in memory to be read out by a mechanic.

The SRS 130 includes front airbags, side impact airbags, rear airbags, safety belts etc. Some modern vehicles have sensors to determine where occupants are seated, the weight of the occupants as well as whether seat belts are fastened. With this information, SRS 130 determines whether any one of the airbags is to be deployed and at what force etc. in case of an accident.

The CPU 110 is also connected to a network interface 105. The network interface 105 may be an Internet wireless link or a transponder that receives and transmits data using antenna 150. When a vehicle that is equipped with an OBCS enters a security zone of a sensitive area, it may be queried as to its security credentials. If it does not answer or its response is not satisfactory, it may be denied entry or may be subjected to a rigorous search before being allowed to proceed.

The credentials of the vehicle may be an Internet protocol (IP) identification (ID) such as a TCP/IP address. The IP ID may be cross-referenced to its owner and/or to whether it has been involved in prior criminal activities or to whether it has been stolen etc. Assigning IP addresses to vehicles is described in a pending application assigned to IBM, filed on Aug. 8, 2001 having, Ser. No. 09/920,407, the disclosure of which is herein incorporated by reference.

IDs of all suspect vehicles may be kept in a list. The list may be in a database. Once the vehicle's ID is received, it may be compared with IDs in the list of IDs. If there is a match, the vehicle may become suspect. At that point, it may be denied entry or may be thoroughly searched before being allowed access into the security zone.

Alternatively, IDs of vehicles that may be allowed entry may be put in the list. If there is not a match between a vehicle's ID and any one of the IDs in the list, the vehicle may be denied entry or searched appropriately.

In either of the two cases disclosed above, the database has to be updated promptly if a vehicle whose IDs are in the database is stolen. Furthermore, certain vehicles, such as rental vehicles, may always be denied entry.

Note that although the OBCS in FIG. 1 is described as being in a car, it may also be incorporated in boats, airplanes etc. In those cases, it may not have an SRS 130 or ABS 135 etc. Consequently, the OBCS in FIG. 1 should not be construed as being limited to cars.

Figure 2:
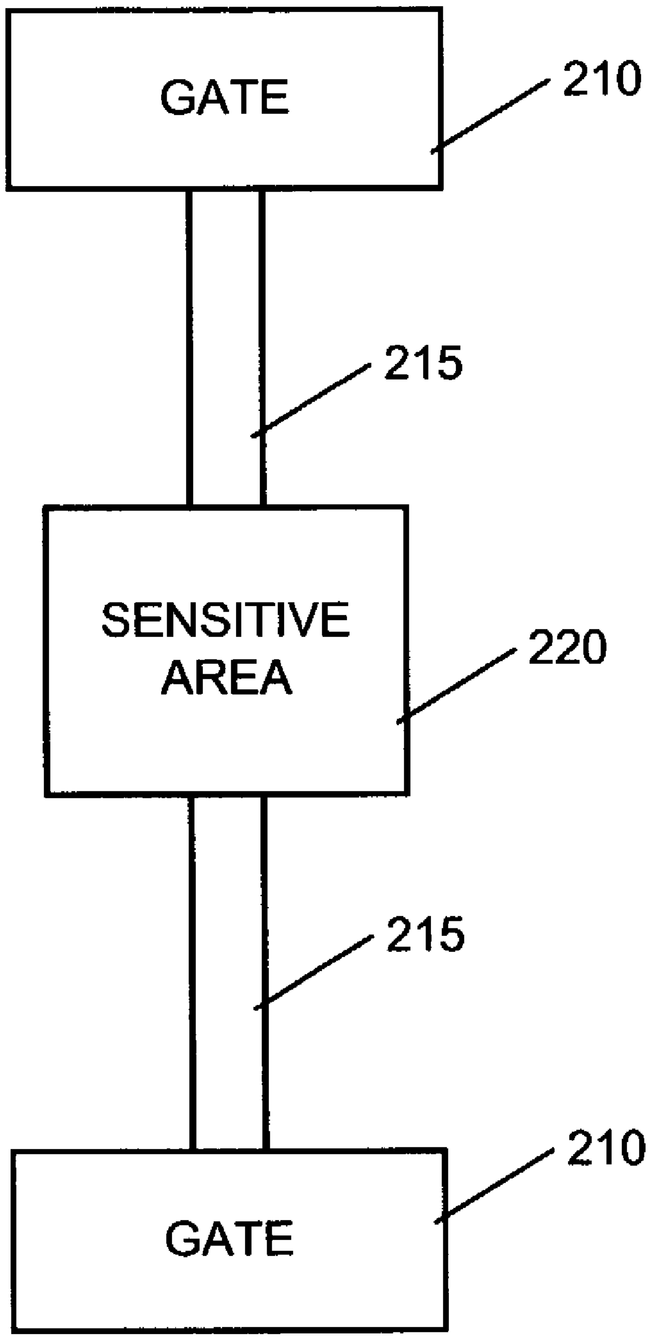
FIG. 2 depicts a sensitive area.

FIG. 2 depicts a sensitive area 220. To gain access to the sensitive area 220, a vehicle has to go through one of two gates (gates 210). Both gates may have a guard who is equipped with a computer system (not shown). The computer system may be used to request the vehicle's ID from all vehicles seeking entry to sensitive area 220. If a vehicle is a suspect vehicle, the guard may deny the vehicle access to the sensitive area 220 or may search the vehicle to determine whether or not it is loaded with explosives or may allow the vehicle to park in a designated area far from structures and individuals. If entry is granted to the vehicle, the vehicle may travel on access road 215 to arrive at the sensitive area 220. The length of either of the roads 215 constitutes the security zone of the sensitive area.

Figure 3:
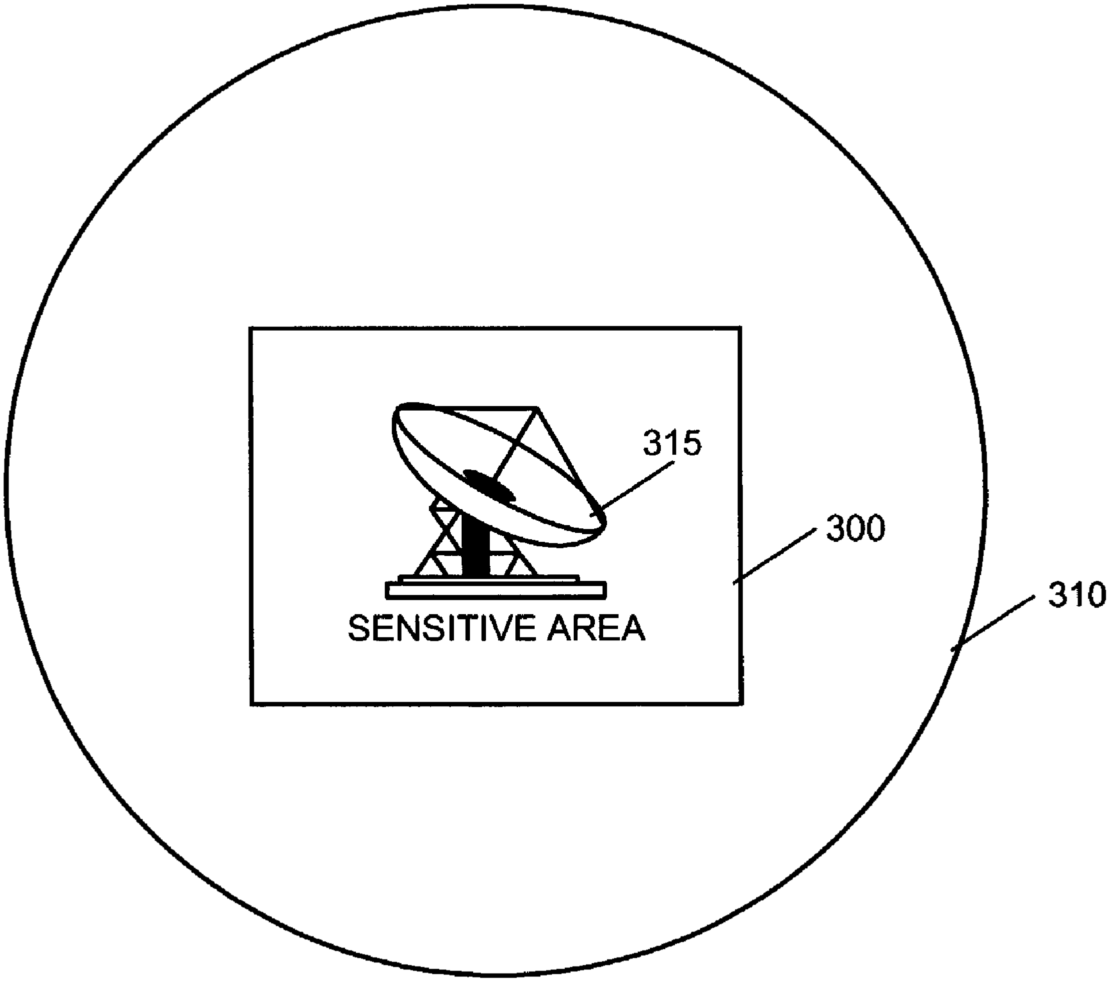
FIG. 3 depicts a sensitive area equipped with a radar measuring distance.

FIG. 3 depicts a sensitive area equipped with a radar measuring distance or radar scanner 315. The radar scanner 315 is used to determine whether a vehicle is within a security zone of sensitive area 300 delineated by perimeter 310.

Figure 4:
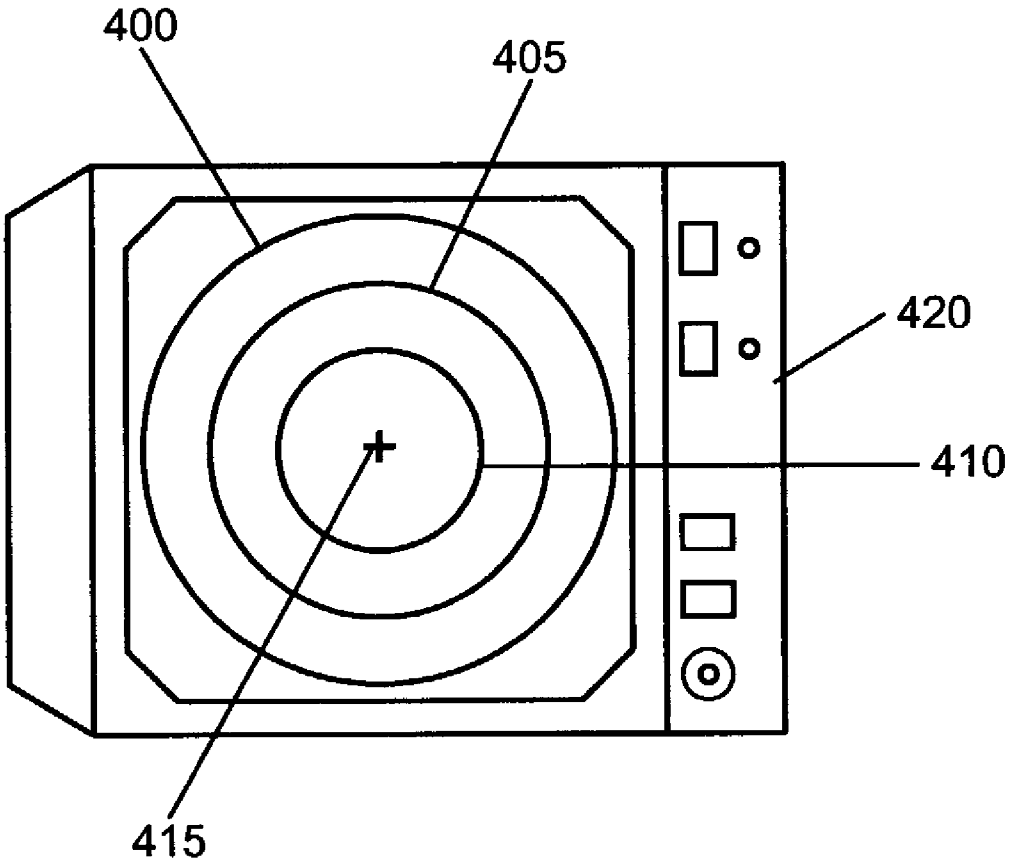
FIG. 4 is a radar screen set up as a Plan Position Indicator (PPI).

FIG. 4 is a radar screen set up as a Plan Position Indicator (PPI). Such radars are well known in the industry and thus will be explained to the extent that the invention can be understood. For a better understanding, FIG. 4 should be viewed in conjunction with FIG. 3. The PPI contains three range circles (range circles 400, 405 and 410), a crosshair 415 and control section 420. The range circles are circles of known diameters and may be used to quickly measure distances. For example, the outside circle (range circle 400) may be the perimeter 310 in FIG. 3. The inner circles (range circles 405 and 410) may represent distances that are closer to the sensitive area 315. The crosshair 415 represents the sensitive area 315. The control section 420 may be used to control the radar 315 as well as to change the distance represented by each range circle.

The radar scanner 315 is constantly rotating in order to obtain a 360° picture of the surrounding area. The image is refreshed with each revolution of the scanner. Thus, when a vehicle enters the security zone delimited by perimeter 310, it will be shown on the PPI. The progress of the vehicle toward the sensitive area 315 will be shown with each revolution of the scanner. Using a control in control area 420, the radar scanner may be made to rotate faster or slower.

When the vehicle enters the security zone, a request for the vehicle's ID may be issued. If the vehicle reaches range circle 405 before it is given clearance to do so, a signal may be sent to the vehicle's OBCS to stop the vehicle in the case of a car or to veer the vehicle off its trajectory in the case of an airplane or a vessel.

In certain cases, instead of a clearance a warning may be sent to the vehicle that may be displayed on display 140 of FIG. 1. The warning may instruct the operator of the vehicle to alter the vehicle's course or to wait for further instructions. For example, in the case of a land-based vehicle, an individual may be dispatched to search the vehicle before allowing the vehicle to proceed. Or, the individuals may instruct the operator of the vehicle to park in a designated area etc. In any case, if the operator of the vehicle proceeds without waiting for proper instructions, when the vehicle reaches range circle 405, the OBCS may take over the control of the vehicle and alter the vehicle's course automatically in the case of non-land-based vehicles, or disable the vehicle (i.e., kill the engine and/or apply the brakes) in the case of land-based vehicles.

If the vehicle ever reaches range circle 410 before being given proper clearance to do so, drastic actions, such as shooting down the vehicle etc., may be taken. Of course, range circle 405 must represent a distance far enough from the sensitive area 300 that if the vehicle is exploded, it will not inflict much or any damage to the sensitive area 300.

In the above disclosure, a radar was used to determine whether a vehicle has entered a security zone. However, it should be obvious to anyone skilled in the art that other technologies may be used. For example, infrared (IR) sensors or magnetic fields akin to those that are used in street intersections may be used. Consequently, the invention is not restricted to the use of a radar to determine whether a car has entered a security zone.

The OBCS 100 of a vehicle should be in a tamper-resistant device. If anyone attempts to access the OBCS, the OBCS should disable or de-activate the vehicle. Only the manufacturer of the vehicle should be able to reactivate the vehicle. In addition, each vehicle's OBCS should be programmed for that particular vehicle. To reactivate the OBCS of a vehicle, the manufacturer should obtain proper credentials of the owner of the vehicle etc.

Figure 5:
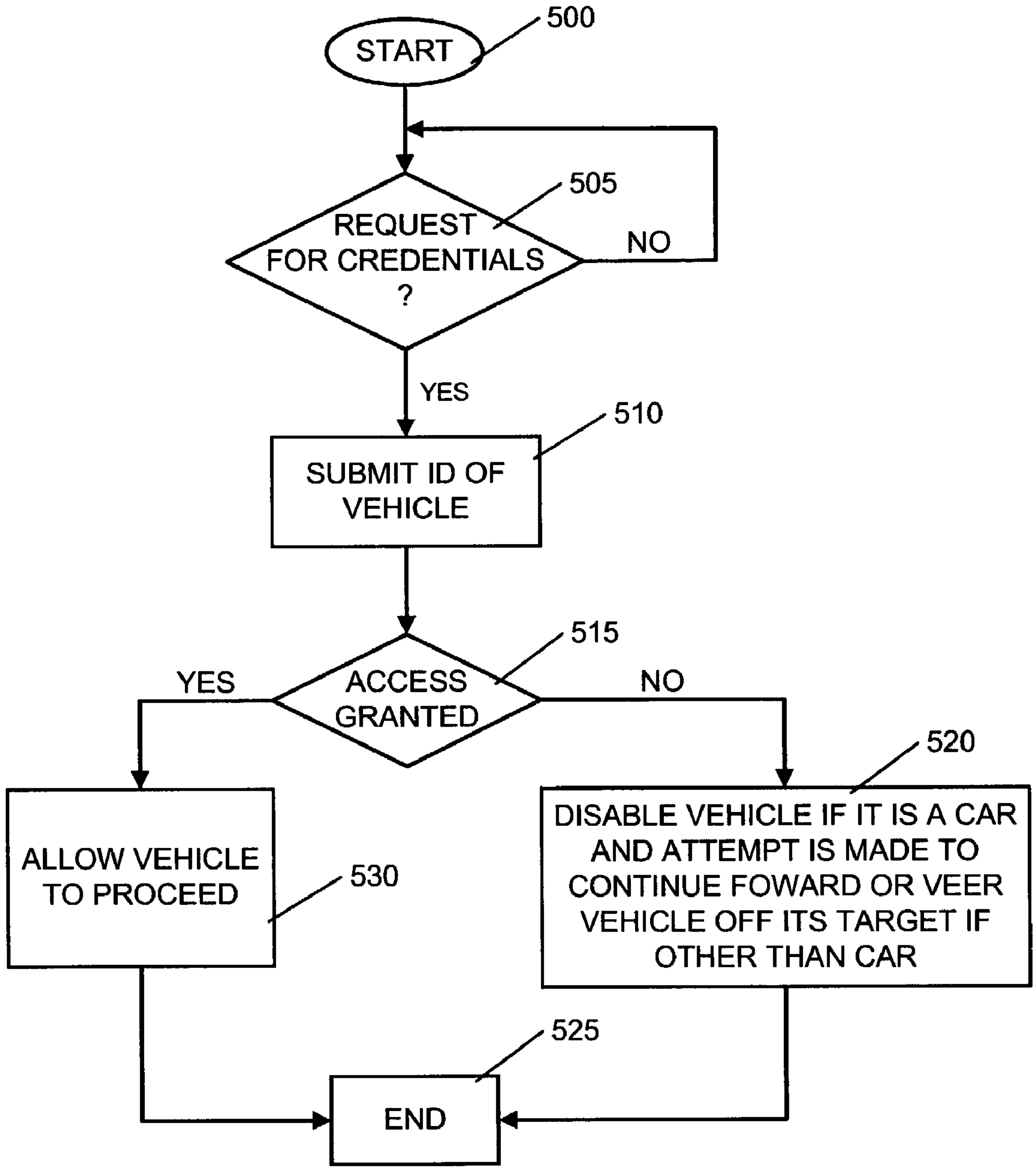
FIG. 5 is a flow chart of a process that may be used by an OBCS of a vehicle.

FIG. 5 is a flow chart of a process that may be used by an OBCS of a vehicle. The process starts when the vehicle is running (step 500). When the vehicle approaches a security zone of a sensitive area, the vehicle's OBCS will receive a request for credentials. Upon receiving the request, the OBCS will transfer the credentials and wait for access. If access is granted, the OBCS will allow the vehicle to proceed and the process ends (steps 505, 510, 515, 530 and 525). If access is denied, the OBCS will not allow the vehicle to continue forward. If an attempt is made to go forward, the OBCS may apply the brakes or disable the vehicle in the case of a car or veer the vehicle off its course in the case of a vehicle other than a car and the process ends (steps 505–525).

Figure 6:
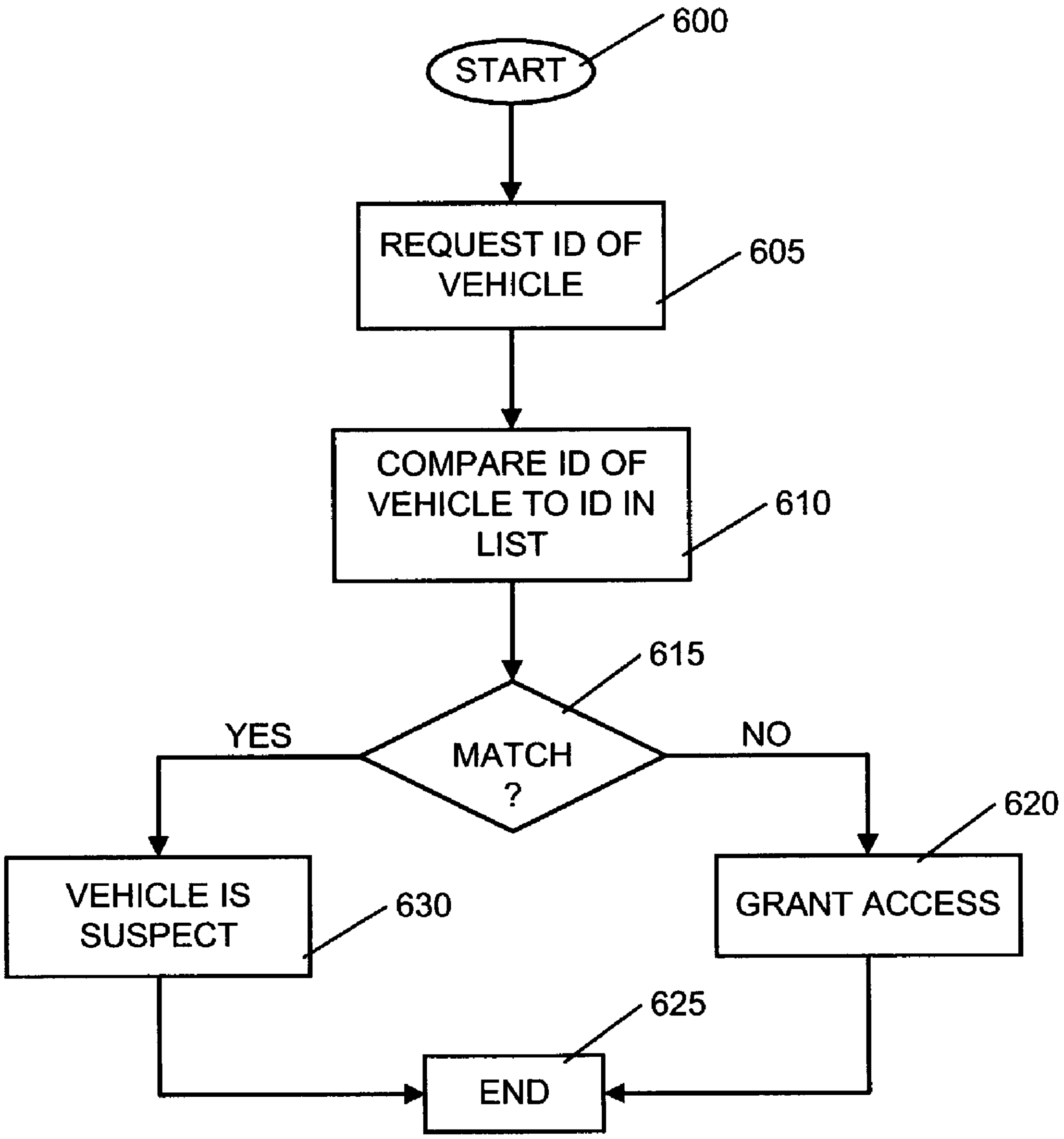
FIG. 6 is a flow chart of a first process that may be used by a computer system to determine whether or not a vehicle is a suspect vehicle.

FIG. 6 is a flow chart of a first process that may be used by a computer system to determine whether or not a vehicle is a suspect vehicle. The process starts when the computer is turned on or is reset (step 600). When a vehicle enters a safety zone of a sensitive area, a request for the vehicle's credentials may be issued. No vehicles are allowed access unless their credentials are received. Once the credentials are received, the credentials may be compared with data in a database. If the database contains data about suspect vehicles and there is a match, the vehicle becomes a suspect vehicle. At that point, access may be denied outright or the vehicle may be searched for explosives etc. in the case of a car. In cases other than a car, the vehicle may be sent a warning for the operator to change its course. If this does not occur, a signal may be sent to the vehicle's OBCS to change the course of the vehicle. After the search, access may be granted or denied. If there is not a match access may be granted (steps 605–630).

Figure 7:
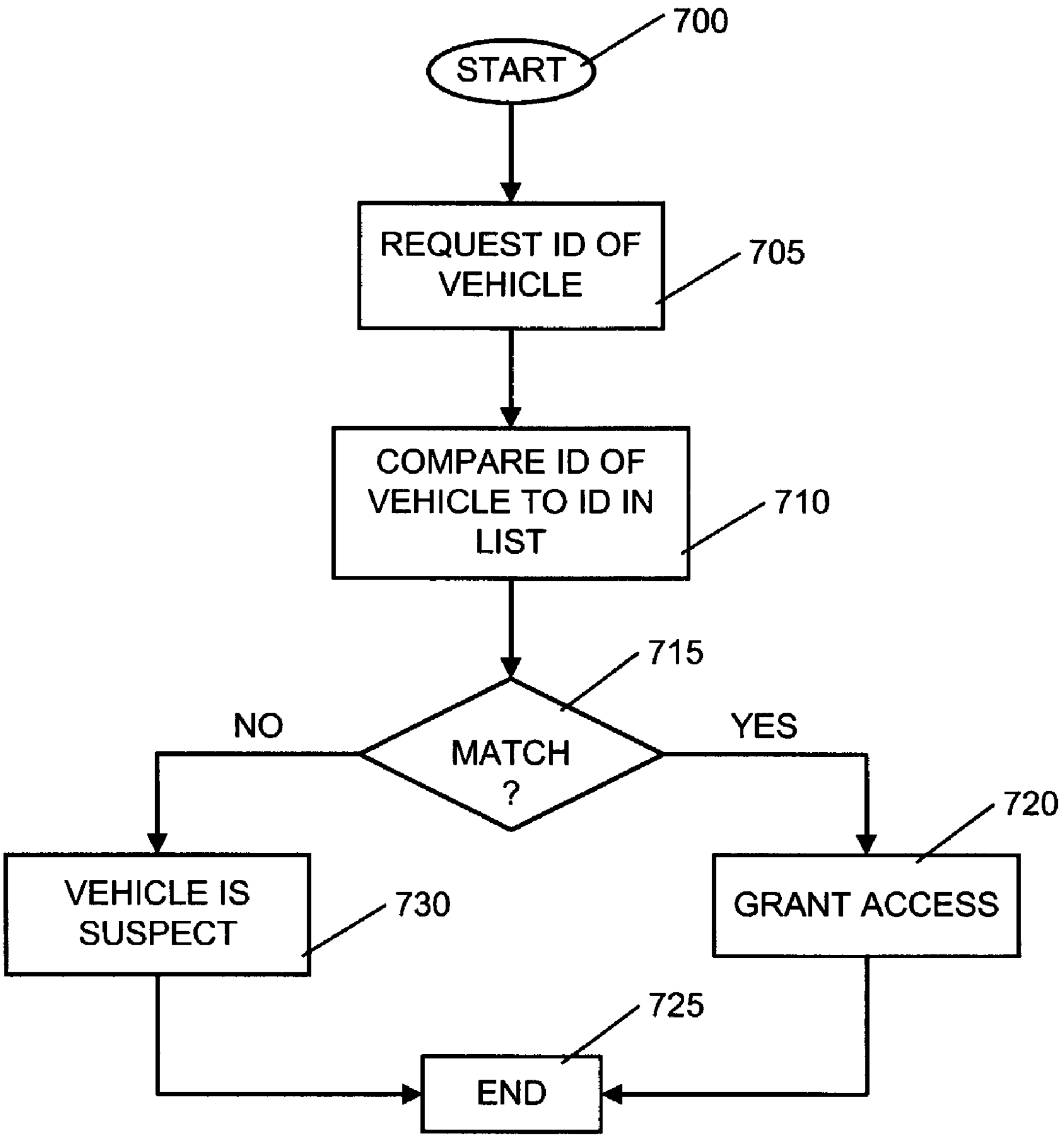
FIG. 7 is a flow chart of a second process that may be used by a computer system to determine whether or not a vehicle is a suspect vehicle.

FIG. 7 is a flow chart of a second process that may be used by a computer system to determine whether or not a vehicle is a suspect vehicle. The process starts when the computer is turned on or is reset (step 700). When a vehicle enters a safety zone of a sensitive area, a request for the vehicle's credentials may be issued. No vehicles are allowed access unless their credentials are received. Once the credentials are received, the credentials may be compared with data in a database. If the database contains data about non-suspect vehicles and there is a match, the vehicle is not a suspect vehicle. At that point, access is granted. If there is not a match, access may be denied outright or the vehicle may be searched for explosives etc. in the case of a car. In cases other than a car, the vehicle may be sent a warning for the operator to change its course. If this does not occur, a signal may be sent to the vehicle's OBCS to change the course of the vehicle. After the search, access may be granted or denied (steps 705–730).

The description of the present invention has been presented for purposes of illustration and description, and is not intended to be exhaustive or limited to the invention in the form disclosed. Many modifications and variations will be apparent to those of ordinary skill in the art. For instance, the invention may be used in different applications. Particularly, the invention may be used to temporarily set security zones when events where groups of individuals are assembled (i.e., concert venues, parks etc.) are occurring. In those cases, a radar equipped with a computer may be used. The radar may be used to detect vehicles entering security perimeters around the parks or concert venues etc. and the computer may be used to identify suspect vehicles. Of course, other technologies (i.e., magnetic fields, infra red sensors etc.) may be used as well. Alternatively, guards equipped with computers may be posted at entrances to the parks or concert venues to ensure that suspect vehicles are dealt with appropriately.

The invention may also be used to restrict parking or entrances to certain areas. For example, certain plants or businesses may allow certain employees to park at designated areas at certain times. If an employee attempts to park in an area other than the one the employee is permitted to park in or the employee attempts to enter or park at a time restricted to the employee, the computer may, through the OBCS, properly instruct the employee not to do so. Failure to follow the instructions may render the vehicle inoperable or a guard may be dispatched to ensure that the instructions are followed.

Thus, the embodiment was chosen and described in order to best explain the principles of the invention, the practical application, and to enable others of ordinary skill in the art to understand the invention for various embodiments with various modifications as are suited to the particular use contemplated. However, the invention is not restricted to the described embodiment.

What is claimed is:

1. A method of determining whether a vehicle is a suspect vehicle when the vehicle approaches a security zone comprising the steps of:

requesting an identification (ID) from an on-board computer system (OBCS) in the vehicle;

comparing, upon receiving the ID from the vehicle, the ID from the vehicle to IDs in a list of IDs;

determining that the vehicle is a suspect vehicle if there is a match between the ID from the vehicle and one from the list of IDs; and having the OBCS take control of the vehicle if the vehicle is determined to be a suspect vehicle.

2. The method of claim 1 wherein if the vehicle is a suspect vehicle, the OBCS does not allowe the vehicle to proceed forward.

3. The method of claim 2 wherein if the suspect vehicle is a land-based vehicle and it is proceeding forward, a signal is sent to the OBCS to stop the vehicle from proceeding forward.

4. The method of claim 3 wherein if the suspect vehicle is not a land-based vehicle, the signal is used to instruct the OBCS to veer the suspect vehicle off its course.

5. The method of claim 4 wherein before the suspect vehicle is veered off its course, the operator is given an opportunity to alter the course of the vehicle.

6. The method of claim 5 wherein if the suspect vehicle is a land-based vehicle, the vehicle is allowed to proceed forward after it has been thoroughly searched.

7. The method of claim 1 wherein the vehicle is determined to be a suspect vehicle if there is not a match between the ID from the vehicle and one of the IDs from the list of IDs.

8. A computer program product on a computer readable medium for determining whether a vehicle is a suspect vehicle when the vehicle approaches a security zone comprising:

code means for requesting an identification (ID) from an on-board computer system (OBCS) in the vehicle;

code means for comparing, upon receiving the ID from the vehicle, the ID from the vehicle to IDs in a list of IDs;

code means for determining that the vehicle is a suspect vehicle if there is a match between the ID from the vehicle and one from the list of IDs; and code means in the vehicle for having the OBCS take control of the vehicle if the vehicle is determined to be a suspect vehicle.

9. The computer program product of claim 8 wherein if the vehicle is a suspect vehicle, the vehicle is not allowed to proceed forward.

10. The computer program product of claim 9 wherein if the suspect vehicle is a land-based vehicle and it is proceeding forward, a signal is sent to the OBCS to stop the vehicle from proceeding forward.

11. The computer program product of claim 10 wherein if the suspect vehicle is not a land-based vehicle, the signal is used to instruct the OBCS to veer the suspect vehicle off its course.

12. The computer program product of claim 11 wherein before the suspect vehicle is veered off its course, the operator is given an opportunity to alter the course of the vehicle.

13. The computer program product of claim 12 wherein if the suspect vehicle is a land-based vehicle, the vehicle is allowed to proceed forward after it has been thoroughly searched.

14. The computer program product of claim 8 wherein the vehicle is determined to be a suspect vehicle if there is not a match between the ID from the vehicle and one of the IDs from the list of IDs.

15. A system for determining whether a vehicle is a suspect vehicle when the vehicle approaches a security zone comprising:

at least one storage device for storing code data; and at least one processor for processing the code data to request an identification (ID) from an on-board computer system (OBCS) in the vehicle, to compare, upon receiving the ID from the vehicle, the ID from the vehicle to IDs in a list of IDs, to determine that the vehicle is a suspect vehicle if there is a match between the ID from the vehicle and one from the list of IDs and to have the OBCS take control of the vehicle if the vehicle is determined to be a suspect vehicle.

16. The system of claim 15 wherein if the vehicle is a suspect vehicle, the vehicle is not allowed to proceed forward.

17. The system of claim 16 wherein if the suspect vehicle is a land-based vehicle and it is proceeding forward, a signal is sent to the OBCS to stop the vehicle from proceeding forward.

18. The system of claim 17 wherein if the suspect vehicle is not a land-based vehicle, the signal is used to instruct the OBCS to veer the suspect vehicle off its course.

19. The system of claim 18 wherein before the suspect vehicle is veered off its course, the operator is given an opportunity to alter the course of the vehicle.

20. The system of claim 19 wherein if the suspect vehicle is a land-based vehicle, the vehicle is allowed to proceed forward after it has been thoroughly searched.

* * * * *